United States Patent
Yoshii

(10) Patent No.: US 8,855,882 B2
(45) Date of Patent: Oct. 7, 2014

(54) BRAKE CONTROL DEVICE AND BRAKING DEVICE

(75) Inventor: Yuji Yoshii, Mishima (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 236 days.

(21) Appl. No.: 13/574,914

(22) PCT Filed: Jan. 25, 2010

(86) PCT No.: PCT/JP2010/050911
§ 371 (c)(1),
(2), (4) Date: Jul. 24, 2012

(87) PCT Pub. No.: WO2011/089727
PCT Pub. Date: Jul. 28, 2011

(65) Prior Publication Data
US 2012/0303232 A1    Nov. 29, 2012

(51) Int. Cl.
G06F 19/00 (2011.01)
B60T 13/66 (2006.01)
B60T 13/52 (2006.01)
B60T 13/72 (2006.01)
B60T 7/04 (2006.01)

(52) U.S. Cl.
CPC ............ B60T 13/52 (2013.01); B60T 2201/06 (2013.01); B60T 13/662 (2013.01); B60T 13/72 (2013.01); B60T 7/042 (2013.01)
USPC ................... 701/70; 710/71; 710/78; 710/83; 710/48

(58) Field of Classification Search
USPC ................... 701/70, 71, 78, 83, 48
See application file for complete search history.

(56) References Cited

U.S. PATENT DOCUMENTS 5,967,628 A * 10/1999 Abe et al. .................. 303/122.12
6,112,637 A * 9/2000 Tsubouchi et al. ............. 91/173
(Continued)

FOREIGN PATENT DOCUMENTS

EP    0 850 815 A1    7/1998
EP    1 067 032 A2    1/2001
(Continued)

OTHER PUBLICATIONS

International Search Report Issued May 11, 2010 in PCT/JP10/50911 Filed Jan. 25, 2010.

Primary Examiner — Khoi Tran
Assistant Examiner — Jorge Peche
(74) Attorney, Agent, or Firm — Oblon, Spivak, McClelland, Maier & Neustadt, L.L.P.

(57) ABSTRACT

A brake control device, wherein control is executed that keeps braking force generated to wheels of a vehicle to a predetermined value or more when detected operating pressure has reached a control determination value, the detected operating pressure being operating pressure input to a brake operating member in a state that the vehicle stops and applied to a working fluid in response to operation force increased using negative pressure generated in an internal combustion engine of the vehicle and being the operating pressure detected by an operating pressure detecting unit, and when the detected operating pressure has exceeded dead point operating pressure which is the operating pressure at a negative pressure dead point at which an effect of increase of the operation force using the negative pressure disappears, at least any one of the detected operating pressure and the control determination value is corrected and the control is executed based on the corrected value. Therefore, the brake control device can appropriately keep the braking force.

15 Claims, 5 Drawing Sheets

(56) References Cited

U.S. PATENT DOCUMENTS

| | | | |
|---|---|---|---|
| 6,132,014 A * | 10/2000 | Kiso et al. | 303/146 |
| 6,322,164 B1 * | 11/2001 | Sakamoto et al. | 303/115.4 |
| 6,460,944 B2 * | 10/2002 | Isono et al. | 303/159 |
| 8,050,830 B2 * | 11/2011 | Komeda et al. | 701/51 |
| 8,600,638 B2 * | 12/2013 | Kato | 701/70 |
| 2001/0003402 A1 * | 6/2001 | Isono et al. | 303/155 |
| 2008/0264059 A1 * | 10/2008 | Hirooka | 60/547.1 |
| 2009/0230761 A1 * | 9/2009 | Sekiguchi et al. | 303/2 |
| 2010/0036577 A1 * | 2/2010 | Kodama et al. | 701/76 |
| 2011/0006591 A1 * | 1/2011 | Yoshii et al. | 303/4 |
| 2011/0066345 A1 * | 3/2011 | Nasu et al. | 701/70 |
| 2011/0125353 A1 * | 5/2011 | Komeda et al. | 701/22 |
| 2011/0190998 A1 * | 8/2011 | Kato et al. | 701/70 |

FOREIGN PATENT DOCUMENTS

| | | |
|---|---|---|
| JP | 10 81212 | 3/1998 |
| JP | 2001 30889 | 2/2001 |
| WO | WO 02/058977 A1 | 8/2002 |
| WO | WO 03/068575 A1 | 8/2003 |
| WO | 2009 110148 | 9/2009 |

* cited by examiner

BRAKE CONTROL DEVICE AND BRAKING DEVICE

FIELD

The present invention relates to a brake control device and a braking device.

BACKGROUND

As a conventional brake control device and a braking device including the brake control device, for example, Patent Literature 1 discloses a braking device which includes a braking means for increasing operating force to a brake operating member by a brake booster using negative pressure generated in an internal combustion engine and generating braking force to wheels in response to the increased operating force and a control device for executing braking force keeping control for keeping the braking force in response to the operation when an operation amount of the brake operating member in response to the operating force has exceeded a control determination value. When brake booster fails, the control device of the braking device sets the control determination value smaller than the control determination value when the brake booster operates normally.

CITATION LIST

Patent Literature

Patent Literature 1: WO/2009/110148

SUMMARY

Technical Problem

Incidentally, it is desired that the braking device described in Patent Literature 1 as described above can appropriately keep the braking force regardless of a state of the negative pressure which is supplied from the internal combustion engine and introduced to brake booster in addition to, for example, the time when the brake booster fails.

An object of the present invention, which was made in view of the circumstances, is to provide a brake control device and a braking device capable of appropriately keeping braking force.

Solution to Problem

In order to achieve the above mentioned object, in a brake control device according to the present invention, control is executed that keeps braking force generated to wheels of a vehicle to a predetermined value or more when detected operating pressure has reached a control determination value, the detected operating pressure being operating pressure input to a brake operating member in a state that the vehicle stops and applied to a working fluid in response to operation force increased using negative pressure generated in an internal combustion engine of the vehicle and being the operating pressure detected by an operating pressure detecting unit, and when the detected operating pressure has exceeded dead point operating pressure which is the operating pressure at a negative pressure dead point at which an effect of increase of the operation force using the negative pressure disappears, at least any one of the detected operating pressure and the control determination value is corrected and the control is executed based on the corrected value.

Further, in the brake control device, it is possible to configure that when the detected operating pressure is corrected, the detected operating pressure is corrected to a larger value.

Further, in the brake control device, it is possible to configure that when the detected operating pressure continuously increases after the detected operating pressure has exceeded the dead point operating pressure, the detected operating pressure or the control determination value is corrected, and when the detected operating pressure decreases after the detected operating pressure has exceeded the dead point operating pressure, the detected operating pressure and the control determination value are not corrected.

Further, in the brake control device, it is possible to configure that when the detected operating pressure is corrected, the detected operating pressure is corrected in response to an effect of increase of the operating force when the detected operating pressure has reached the dead point operating pressure.

Further, in the brake control device, it is possible to configure that when the detected operating pressure is corrected, the detected operating pressure is corrected in response to a deviation between the detected operating pressure and the dead point operating pressure.

Further, in the brake control device, it is possible to configure that when the control determination value is corrected, the control determination value is corrected to a smaller value.

In order to achieve the above mentioned object, in a brake control device according to the present invention, when detected operating pressure has exceeded dead point operating pressure, the detected operating pressure is corrected and a determination as to control for keeping braking force generated to wheels of the vehicle to a predetermined value or more is executed based on the corrected value, the detected operating pressure being operating pressure input to a brake operating member and applied to a working fluid in response to operating force increased using negative pressure generated in an internal combustion engine of a vehicle and being the operating pressure detected by an operating pressure detecting unit, and the dead point operating pressure being the operating pressure at a negative pressure dead point at which an effect of increase of the operating pressure using the negative pressure disappears.

In order to achieve the above mentioned object, in a brake control device according to the present invention, a braking device main body configured to be controlled by the brake control device and generate braking force.

Advantageous Effects of Invention

When the detected operating pressure has exceeded the dead point operating pressure, since the brake control device according to the present invention corrects at least any one of the detected operating pressure or the control determination value and executes the control for keeping the braking force based on the corrected value, the brake control device achieves an effect that the braking force can be appropriately kept.

When the detected operating pressure has exceeded the dead point operating pressure, since the brake control device according to the present invention corrects the detected operating pressure and executes a determination as to the control for keeping the braking force based on the corrected value, the brake control device achieves the effect that the braking force can be appropriately kept.

When the detected operating pressure has exceeded the dead point operating pressure, since the braking device according to the present invention corrects at least any one of the detected operating pressure or the control determination value and executes the control for keeping the braking force based on the corrected value, the braking device achieves the effect that the braking force can be appropriately kept.

DESCRIPTION OF EMBODIMENTS

An embodiment of a brake control device and a braking device according to the present invention will be explained below in detail based on drawings. Note that the present invention is not limited by the embodiment. Further, the components in the embodiment include components that can be replaced by a person skilled in the art as well as are easy or include substantially the same components.

Embodiment

Figure 1:
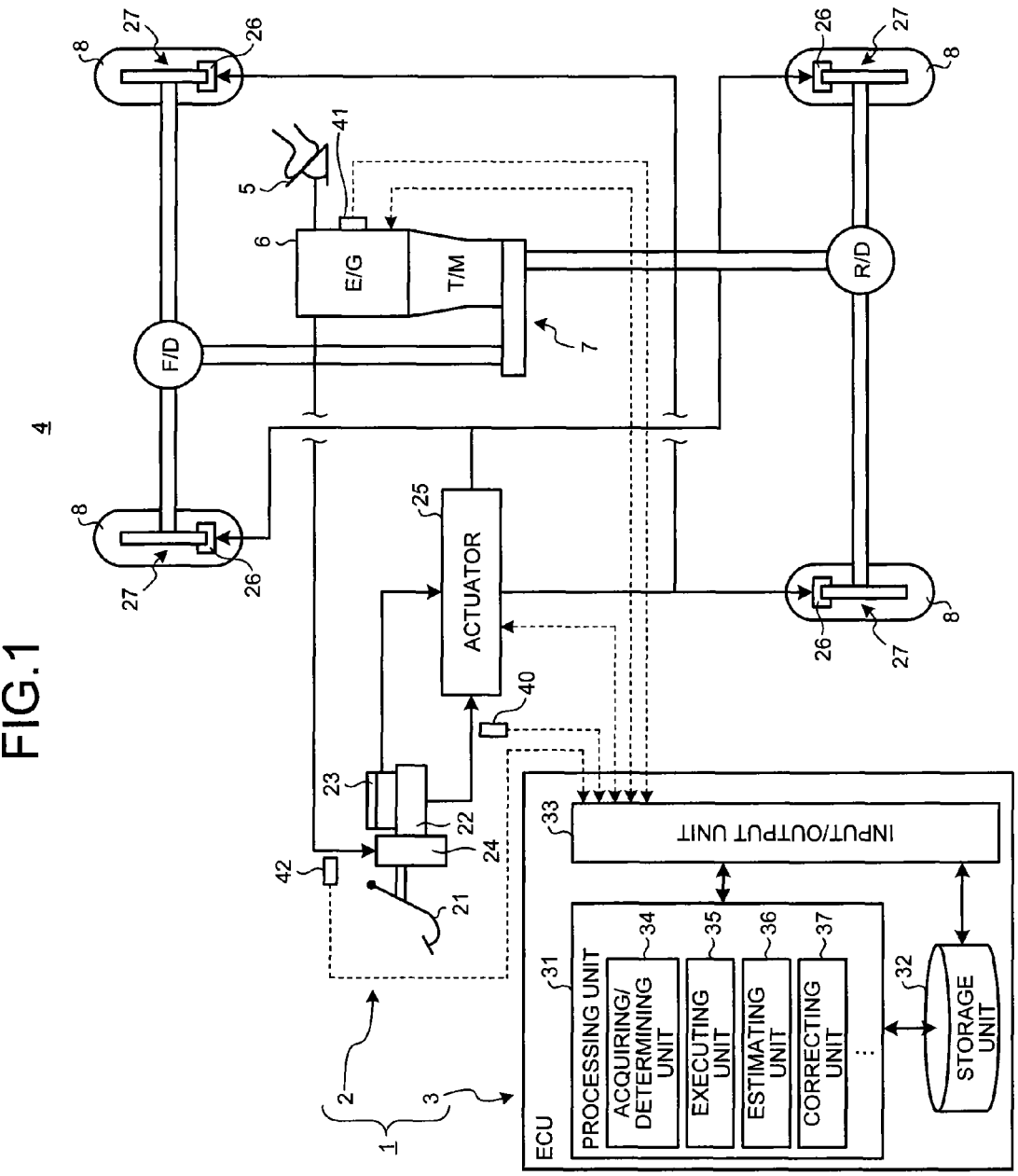
FIG. 1 is a schematic configuration view of a braking device according to an embodiment.
Figure 2:
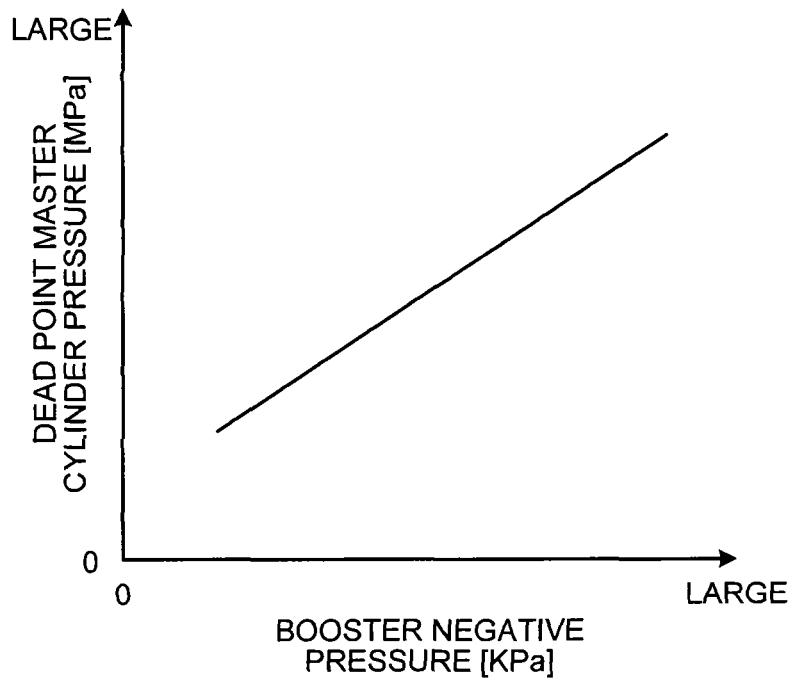
FIG. 2 is an example of a dead point master cylinder pressure map of the braking device according to the embodiment.
Figure 3:
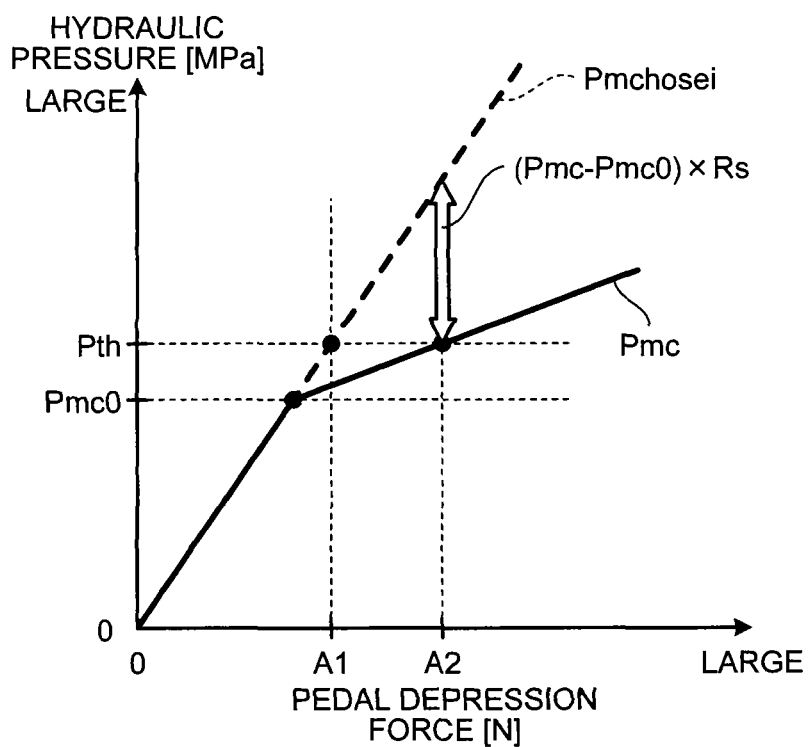
FIG. 3 is a graph explaining an example of control in the braking device according to the embodiment.
Figure 4:
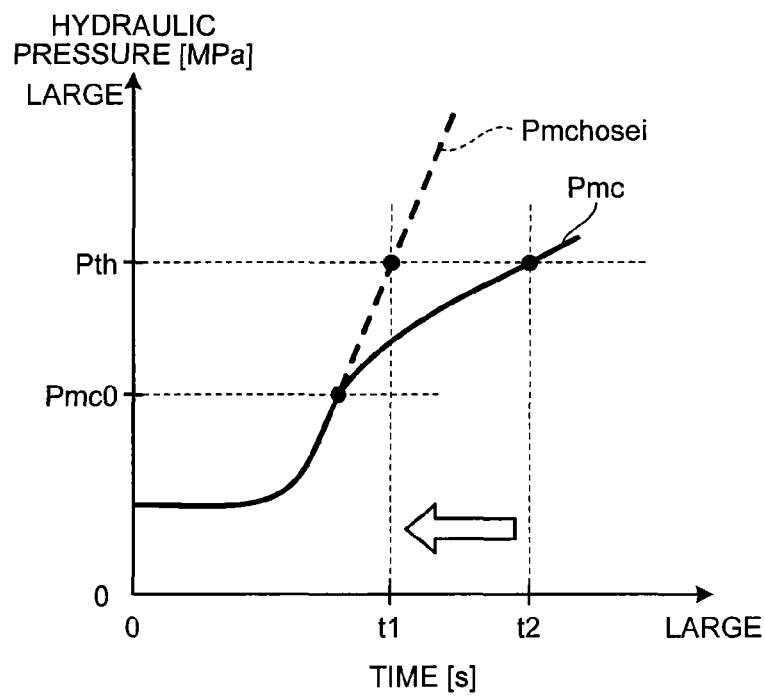
FIG. 4 is a time chart illustrating an example of the control in the braking device according to the embodiment.
Figure 5:
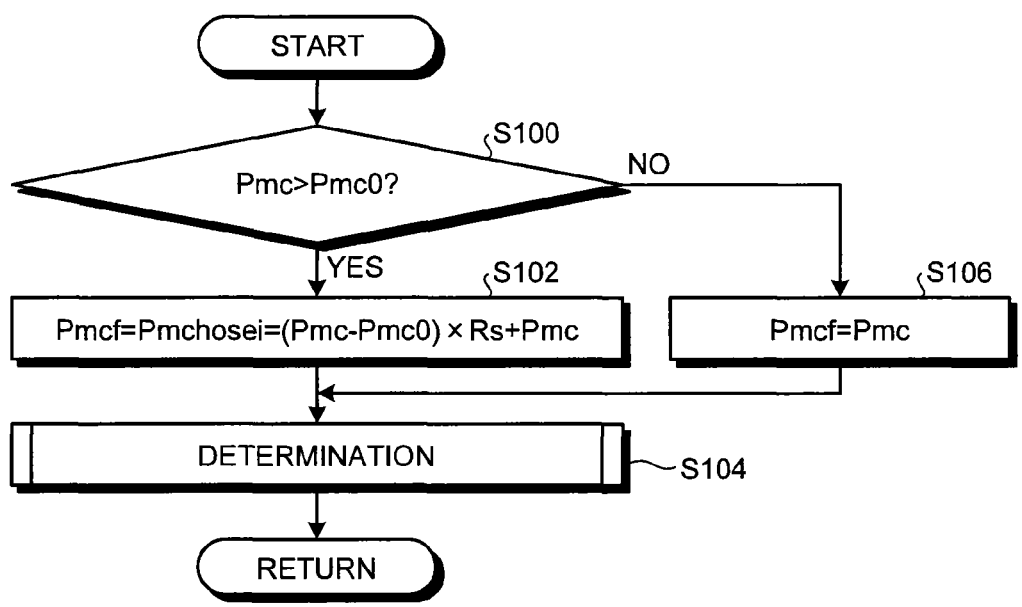
FIG. 5 is a flowchart illustrating an example of the control in the braking device according to the embodiment.
Figure 6:
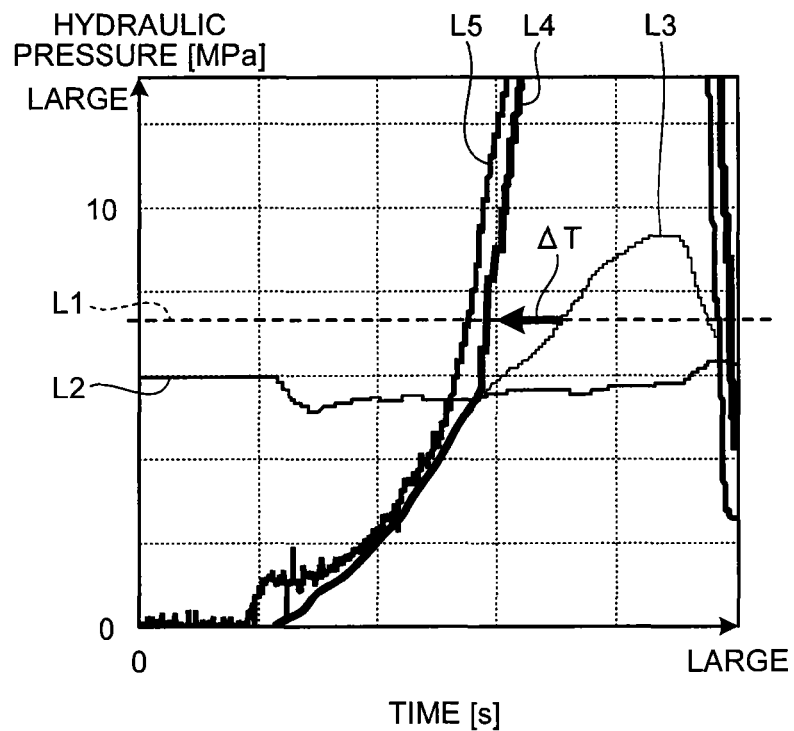
FIG. 6 is a graph illustrating an example of an operation of the braking device according to the embodiment.

FIG. 1 is a schematic configuration view of a braking device according to the embodiment, FIG. 2 is an example of a dead point master cylinder pressure map of the braking device according to the embodiment, FIG. 3 is a graph explaining an example of control in the braking device according to the embodiment, FIG. 4 is a time chart illustrating an example of the control in the braking device according to the embodiment, FIG. 5 is a flowchart illustrating an example of the control in the braking device according to the embodiment, and FIG. 6 is a graph illustrating an example of an operation of the braking device according to the embodiment.

As illustrated in FIG. 1, a braking device 1 according to the embodiment is mounted on a vehicle 4. The vehicle 4 is configured such that an engine (gasoline engine, diesel engine, LPG engine, and the like) 6 as an internal combustion engine generates mechanical power (engine torque) in response to an operation of an accelerator pedal 5 by a driver and the mechanical power is transmitted to wheels 8 via a power transmission device 7 such as a transmission, a differential device, a drive shaft, and the like, and drive force is generated to the wheels 8. Note that a drive mode of the vehicle 4 is not limited only to a four-wheel drive mode exemplified in FIG. 1 and the drive mode may be any mode such as a front-wheel drive mode, a rear-wheel drive mode, and the like. Further, the vehicle 4 may use an internal combustion engine and an electric motor together as drive sources.

Then, the braking device 1 applies brakes to the vehicle 4 by generating braking force (braking torque) to the wheels 8 of the vehicle 4 in response to a braking operation of the driver. The braking device 1 is configured including a hydraulic braking device 2 as a braking device main body and an ECU 3 as a brake control device.

The hydraulic braking device 2 is configured including a brake pedal 21 as a brake operating member, a master cylinder 22 as an operating pressure applying unit, a reservoir 23, a booster 24 as a brake booster unit, an actuator 25 as a pressure keeping unit, wheel cylinders 26, and hydraulic braking units 27 as braking force generating units. In the hydraulic braking device 2, a hydraulic path is filled with brake oil as a working fluid, the hydraulic path being connected to the wheel cylinders 26 from the master cylinder 22 via the actuator 25.

In the hydraulic braking device 2, basically, when the driver operates the brake pedal 21, master cylinder pressure as operating pressure is applied to the brake oil by the master cylinder 22 in response to pedal depression force as operating force acting on the brake pedal 21. Then, the hydraulic braking device 2 generates pressure braking force by that the master cylinder pressure acts in the respective wheel cylinders 26 as wheel cylinder pressure as brake pressure.

Note that, here, the hydraulic path connected to the master cylinder 22 is configured by being divided to plural routes (for example, two routes) and the plural routes of the hydraulic path are independently connected to the master cylinder 22. Further, although the hydraulic path connected to the master cylinder 22 here is configured as a so-called cross piping, the hydraulic path is not limited thereto and may be configured as a so-called front/back piping.

Specifically, when the driver generates the braking force to the vehicle 4, the brake pedal 21 is operated for braking in response to a request for braking of the driver. When pedal depression force is input from the driver to the brake pedal 21, the master cylinder 22 pressurizes the brake oil by a piston which is operated in association with the brake pedal 21 and applies master cylinder pressure in response to the pedal depression force. That is, the master cylinder 22 converts the pedal depression force input via the brake pedal 21 to the master cylinder pressure in response to the pedal depression force. The reservoir 23 is coupled with the master cylinder 22 and the brake oil is reserved therein. The reservoir 23 and the master cylinder 22 communicate with each other in a state that the brake pedal 21 is not depressed, and when the brake pedal 21 is depressed, the communication therebetween is disconnected, and the brake oil is pressurized by the master cylinder 22.

The booster 24, is, for example, a vacuum booster device, attached to the master cylinder 22 integrally therewith, connected to an intake air path (intake air route) of the engine 6 via a negative pressure pipe and the like, and supplied with negative pressure generated in the engine 6. The booster 24 can increase the pedal depression force input to the brake pedal 21 using the negative pressure supplied from the engine 6. At the time, the booster 24 boosts (increases) the pedal depression force at a predetermined boost ratio (so-called servo ratio=output/input) in response to the negative pressure supplied thereto and transmits the boosted pedal depression force to the piston of the master cylinder 22. The booster 24 amplifies the pedal depression force by force which acts on a not illustrated diaphragm in response to, for example, a differential pressure between the supplied negative pressure and pressure due to outside air. The booster 24 can reduce the pedal depression force to the brake pedal 21 by the driver by increase the pedal depression force by the negative pressure when the brake pedal 21 is operated for braking and increasing an input of the pedal depression force to the master cylinder 22 with respect to an input of the pedal depression force to the brake pedal 21. As a result, the master cylinder 22 pressurizes the brake oil in response to the pedal depression force amplified by the booster 24 and applies the master cylinder pressure to the brake oil. That is, the master cylinder pressure applied by the master cylinder 22 is in response to the pedal depression force input to the brake pedal 21 by the driver and the negative pressure of the engine 6.

The actuator 25 is disposed on the hydraulic path of the brake oil that connects the master cylinder 22 to the wheel cylinders 26, increases and decreases liquid pressure in the respective wheel cylinders 26 by control by the ECU 3 separately from a braking operation of the brake pedal 21, and controls the braking force applied to the respective wheels 8. The actuator 25 controls wheel cylinder pressure that acts on the respective wheel cylinders 26 in response to the master cylinder pressure applied to the brake oil by the master cylinder 22 or causes the wheel cylinder pressure to act on the respective wheel cylinders 26 regardless whether or not the master cylinder pressure is applied to the brake oil by the master cylinder 22.

The actuator 25 is composed of, for example, a various type of a known hydraulic pressure control device (hydraulic control circuit) controlled by the ECU 3. The actuator 25 is configured including plural pipes, an oil reservoir, an oil pump, the respective hydraulic pipes connected to the respective wheel cylinders 26, plural electromagnetic valves for increasing and decreasing hydraulic pressure of the respective hydraulic pipes, respectively, and the like. The actuator 25 functions as a working fluid pressure adjusting unit that transmits the hydraulic pressure (master cylinder pressure) in the hydraulic pipes to the respective wheel cylinders 26 to be described later as it is or after it has been pressurized and adjusted in response to a control command of the ECU 3.

When a predetermined electromagnetic valve is driven in response to, for example, a control command of the ECU 3, the actuator 25 can pressurize and adjust a differential pressure between the pressure of the brake oil pressurized by the oil pump and the master cylinder pressure as pressurized pressure and apply the pressurized pressure to the brake oil (pressure increasing mode). In the case, the wheel cylinder pressure becomes total pressure of the master cylinder pressure and the pressurized pressure. Further, when a predetermined electromagnetic valve is driven in response to, for example, a control command of the ECU 3, the actuator 25 can keep the wheel cylinder pressure which acts on the wheel cylinders 26 to be described later approximately constant, and thereby the actuator 25 can keep the braking force generated to the wheels 8 of the vehicle 4 to a predetermined value or more (keeping mode). Further, when a predetermined electromagnetic valve is driven in response to, for example, a control command of the ECU 3, the actuator 25 can reduce the wheel cylinder pressure kept to the wheel cylinders 26 to be described later and the like (pressure reducing mode).

The actuator 25 can adjust the wheel cylinder pressure that acts on the respective wheel cylinders 26 independently, that is, separately by that the oil pump and the electromagnetic valves are driven under the control of the ECU 3 as described above. Even when the brake pedal 21 is not operated by the driver, the actuator 25 can pressurize the brake oil by the ECU 3. With the operation, when any of the front/rear wheels transmits the drive force to a road surface, the actuator 25 can execute a traction control for suppressing a slip to the road surface and VSC (Vehicle Stability Control) for suppressing that any of the front/rear wheels slips laterally while the vehicle 4 turns.

The wheel cylinders 26 constitute the hydraulic braking units 27 together with calipers, brake pads, disc rotors, and the like. The hydraulic braking units 27 are disposed to the respective wheels 8 of the vehicle 4, respectively. The hydraulic braking units 27 are composed of calipers, brake pads, disc rotors, and the like. Since the wheel cylinder pressure, which is the pressure of the brake oil with which the respective wheel cylinders 26 are filled, that is, the total pressure of the master cylinder pressure and the pressurized pressure acts on the hydraulic braking units 27 as braking pressure, friction force is generated between the brake pads and the brake rotors, and thereby the hydraulic braking units 27 generate pressure braking force.

The ECU 3 is configured including an electronic circuit mainly composed of a known microcomputer including a CPU, ROM, RAM, and an interface and controls the actuator 25 by executing a stored brake control program. Here, the ECU 3 controls an operation of the engine 6 based on various input signals input from sensors attached to respective locations of the vehicle 4 on which the engine 6 is mounted and based on various maps. The ECU 3 is input with electric signals which correspond to results of detection detected by various sensors such as a master cylinder pressure sensor 40 as an operating pressure detecting unit for detecting the master cylinder pressure (operating pressure) between the master cylinder 22 and the actuator 25, an engine revolution speed sensor 41 for detecting an engine revolution speed of the engine 6, a negative pressure sensor 42 for detecting the negative pressure supplied to the booster 24, and the like. Note that the master cylinder pressure detected by the master cylinder pressure sensor 40 corresponds to an operation amount of the brake pedal 21 depressed by the driver.

In the braking device 1 configured as described above, when the driver operates the brake pedal 21 and pedal depression force is input to the brake pedal 21, the pedal depression force is boosted by the booster 24 at a predetermined pressure boost ratio in response to negative pressure and transmitted to the master cylinder 22. The pedal depression force, which is increased by the booster 24 and transmitted to the master cylinder 22, is converted to the master cylinder pressure by the master cylinder 22 as well as is transmitted to the wheel cylinders 26 via the actuator 25. At the time, the wheel cylinder pressure supplied to the wheel cylinders 26 is adjusted to predetermined hydraulic pressure by the actuator 25 and transmitted to the wheel cylinders 26. Then, since pressure braking torque acts on the respective hydraulic braking units 27 by the friction force by that predetermined wheel cylinder pressure acts on the respective wheel cylinders 26 and brake pads of the calipers are pressed to the disc rotors, the respective hydraulic braking units 27 can reduce a rotation of the wheels 8.

Here, the braking device 1 executes slope start assist control composed including braking force keeping control and braking force keeping release control by that the braking device 1 controls the hydraulic braking device 2 in response to a predetermined operation executed by the driver when the vehicle 4 stops on a slope road and the like. The ECU 3 keeps the wheel cylinder pressure as keeping pressure of a predetermined value or more by controlling the actuator 25 based on a predetermined braking force keeping control command and executes the braking force keeping control for keeping the braking force applied to the respective wheels 8. Further, the ECU 3 reduces the wheel cylinder pressure, which is kept as the keeping pressure of a predetermined value or more by controlling the actuator 25 based on a predetermined braking force keeping release control command and executes the braking force keeping release control for releasing the braking force kept to the respective wheels 8. As a result, the vehicle 4 can be prevented from, for example, being moved backward when the vehicle 4 starts on an up-slope road so that the driver can start the vehicle 4 smoothly.

The predetermined braking force keeping control command is created when, for example, a predetermined braking operation of the driver, for example, an additional depression operation of the brake pedal 21 is detected as a predetermined switch operation executed by the driver to execute the braking force keeping control in the state that the vehicle 4 stops. The predetermined braking force keeping release control command is created when, for example, a predetermined time (for example, 2 seconds) has passed after it is detected that a braking operation is turned OFF based on the master cylinder pressure detected by the master cylinder pressure sensor 40, when it is detected that an accelerator operation is turned ON, or when a predetermined cancel operation by the driver is detected, for example, when it is detected that the brake pedal 21 is subjected to the additional depression operation again, and the like. Here, the ECU 3 executes the slope start assist control by detecting the predetermined braking operation, cancel operation, and the like of the driver based on detected master cylinder pressure as detected operating pressure which is the master cylinder pressure detected by the master cylinder pressure sensor 40.

Incidentally, in the braking device 1, since, for example, the negative pressure supplied to the booster 24 varies in response to an operating state of the engine 6, there is a possibility that a negative pressure dead point of the booster 24 varies and thus the pedal depression force increased by the booster 24 varies. As a result, in the braking device 1, even if the same pedal depression force is input from the driver, there is a possibility that the master cylinder pressure generated in the master cylinder 22 varies in response to the pedal depression force increased by the booster 24. Here, the negative pressure dead point of the booster 24 is a limit point (assist limit point) of an effect for the booster 24 to boost (increase) the pedal depression force and is an operation point at which an effect of increase of the pedal depression force using the negative pressure approximately disappears in the booster 24. The negative pressure dead point of the booster 24 is varied by that the negative pressure supplied to the booster 24 varies.

Then, when the braking device 1 and the ECU 3 execute control for keeping the braking force generated to the wheels 8 to a predetermined value or more at the time, for example, the detected master cylinder pressure has reached the control determination value, since the pedal depression force increased by the booster 24 varies as described above, there is a possibility that a dispersion is generated in a start of the control for keeping the braking force, and the like. In other words, in the braking device 1 and the ECU 3, even if the pedal depression force input from the driver to the brake pedal 21 is the same, since, for example, the negative pressure dead point of the booster 24 varies in response to the operating state of the engine 6 and thus the pedal depression force increased by the booster 24 varies, there is a possibility that necessary pedal depression force varies until the detected master cylinder pressure has reached the control determination value.

In particular, the engine 6 of now a day has a tendency that negative pressure becomes low, and thereby there is a possibility that the effect of increase of the pedal depression force in the booster 24 becomes insufficient in an ordinarily assumed operation region even if, for example, the booster 24 does not fail. In the case, the braking device 1 can secure appropriate braking force and a deceleration by pressurization compensation by the pressure increasing mode of the actuator 25 and the like while the vehicle 4 travels. However, since it is difficult for the braking device 1 to continuously operate the actuator 25 in the state that the vehicle 4 stops and further the negative pressure supplied from the engine 6 to the booster 24 is also lowered, there is a case that the effect of increase of the pedal depression force cannot be sufficiently expected in the booster 24. Accordingly, in the braking device 1, after the negative pressure dead point of the booster 24 has been reached, there is a possibility that actual master cylinder pressure and eventually an increase width of the detected master cylinder pressure become small with respect to the increase of the pedal depression force by the driver. As a result, in the braking device 1 and the ECU 3, there is a possibility that a detection of a predetermined braking operation, a detection of a cancel operation, and the like based on, for example, the detected master cylinder pressure are not stabilized and a dispersion is generated in the start and the cancel of the control for keeping the braking force, in a timing of pressure reduction, and the like.

Thus, when the detected master cylinder pressure has exceeded the dead point master cylinder pressure as the dead point operating pressure which is the master cylinder pressure in the negative pressure dead point of the booster 24, the ECU 3 of the braking device 1 of the embodiment approximately keeps the braking force by correcting a numerical value used to a determination as to the slope start assist control including the braking force keeping control and the braking force keeping release control. Here, the ECU 3 corrects at least any one of the detected master cylinder pressure or the control determination value as the numerical value used to the determination as to the slope start assist control.

Here, the ECU 3 is configured including a processing unit 31, which is composed of memory and a CPU (Central Processing Unit) that are not illustrated, a storage unit 32 in which a computer program for controlling respective sections of the braking device 1, and the like are stored, a not illustrated drive circuit for driving the respective sections of the braking device 1, and an input/output unit 33 to which the various sensors are connected. In the ECU 3, these components are connected with each other so that a signal can be delivered therebetween. Then, in the ECU 3, the processing unit 31 is function-conceptually provided with an acquiring/determining unit 34, an executing unit 35, an estimating unit 36, and a correcting unit 37.

The acquiring/determining unit 34 obtains various information used in the slope start assist control including the braking force keeping control and the braking force keeping release control and executes various determinations based on the obtained information. The acquiring/determining unit 34 basically compares the detected master cylinder pressure that is obtained thereby with the control determination value set to the detected master cylinder pressure in the state that the vehicle 4 stops.

When, for example, the detected master cylinder pressure has reached a control start determination value that is a first control determination value, the acquiring/determining unit 34 detects the additional depression operation of the brake pedal 21 as a predetermined braking operation of the driver and creates the braking force keeping control command. Further, when the detected master cylinder pressure has reached a control cancel determination value that is a second control determination value, the acquiring/determining unit 34 detects the additional depression operation of the brake pedal 21 executed again as the predetermined cancel operation of the driver and creates the braking force keeping release control command (in other words, braking force keeping control cancel command).

Here, the control start determination value and the control cancel determination value are determination values for determining whether or not the driver executes the additional depression operation of the brake pedal 21 in the state that the vehicle 4 stops, and, in other words, are determination values for detecting whether or not the driver executes the additional depression operation of the brake pedal 21 from the state that the vehicle 4 stops. The control start determination value and the control cancel determination value are set to values that are obtained by adding previously set predetermined pressure (for example, hydraulic pressure corresponding to pedal depression force of about 25 N) to stop time master cylinder pressure which is the detected master cylinder pressure when the vehicle 4 stops.

The executing unit 35 executes the slope start assist control. The executing unit 35 controls a drive of the actuator 25 in response to the braking force keeping control command and the braking force keeping release control command and executes the slope start assist control including the braking force keeping control and the braking force keeping release control.

The estimating unit 36 estimates the dead point master cylinder pressure in the negative pressure dead point of the booster 24 in response to the negative pressure supplied to the booster 24. The dead point master cylinder pressure is the master cylinder pressure at the negative pressure dead point of the booster 24 as described above and varies as the negative pressure supplied to the booster 24 varies. Basically, the dead point master cylinder pressure can be unambiguously estimated based on the negative pressure supplied to the booster 24. The estimating unit 36 calculates the dead point master cylinder pressure in response to the negative pressure which is detected by the negative pressure sensor 42, obtained by the acquiring/determining unit 34, and supplied to the booster 24.

Note that engine negative pressure, which is generated in the intake air path (intake air route) of the engine 6, in other words, the negative pressure supplied to the booster 24 has such a relation that it becomes relatively small as the engine revolution speed become relatively large. Accordingly, the estimating unit 36 can also estimate the negative pressure supplied to the booster 24 based on the engine revolution speed which is detected by the engine revolution speed sensor 41 and obtained by the acquiring/determining unit 34. In the case, the braking device 1 may be a configuration in which the negative pressure sensor 42 is not provided. That is, it is sufficient that the braking device 1 is provided with any one of the engine revolution speed sensor 41 and the negative pressure sensor 42 as a means for detecting the negative pressure supplied to the booster 24.

Here, the estimating unit 36 determines the dead point master cylinder pressure based on, for example, the dead point master cylinder pressure map exemplified in FIG. 2. In the dead point master cylinder pressure map, a horizontal axis illustrates the negative pressure supplied to the booster 24, and a vertical axis illustrates the dead point master cylinder pressure. The dead point master cylinder pressure map describes a relation between the negative pressure supplied to the booster 24 and the dead point master cylinder pressure. In the dead point master cylinder pressure map, the dead point master cylinder pressure increases as the negative pressure supplied to the booster 24 increases. The estimating unit 36 determines the dead point master cylinder pressure from the negative pressure which is obtained by the acquiring/determining unit 34 and supplied to the booster 24 based on the dead point master cylinder pressure map. Note that the estimating unit 36 may determine the dead point master cylinder pressure based on an expression corresponding to the dead point master cylinder pressure map.

Then, the acquiring/determining unit 34 obtains the detected master cylinder pressure detected by the master cylinder pressure sensor 40, compares the dead point master cylinder pressure estimated by the estimating unit 36 with the detected master cylinder pressure obtained thereby, and determines whether or not the detected master cylinder pressure has exceeded the dead point master cylinder pressure.

When the detected master cylinder pressure has exceeded the dead point master cylinder pressure, the correcting unit 37 corrects at least any one of the detected master cylinder pressure or the control determination value. When it is determined that the detected master cylinder pressure detected by the acquiring/determining unit 34 has exceeded the dead point master cylinder pressure, the correcting unit 37 corrects the detected master cylinder pressure or the control determination value or both of them so that a deviation between the detected master cylinder pressure and the control determination value becomes small.

Here, when the detected master cylinder pressure continuously increases after the detected master cylinder pressure has exceeded the dead point master cylinder pressure, the correcting unit 37 corrects the detected master cylinder pressure or the control determination value. In contrast, when the detected master cylinder pressure decreases after the detected master cylinder pressure has exceeded the dead point master cylinder pressure, the correcting unit 37 does not correct the detected master cylinder pressure and the control determination value. With the operation, only when the driver executes the additional depression operation of the brake pedal 21 after the detected master cylinder pressure has exceeded the dead point master cylinder pressure, the braking device 1 and the ECU 3 correct the detected master cylinder pressure or the control determination value, and when the additional depression operation of the brake pedal 21 is not further executed although the detected master cylinder pressure has exceeded the dead point master cylinder pressure, it can be prevented to execute an unnecessary calculation, and thereby a calculation amount can be reduced.

The correcting unit 37 of the embodiment corrects the detected master cylinder pressure. When the correcting unit 37 corrects the detected master cylinder pressure, the correcting unit 37 corrects the detected master cylinder pressure so that the deviation between the detected master cylinder pressure and the control determination value becomes small, that is, the correcting unit 37 corrects the detected master cylinder pressure to a larger value. When the correcting unit 37 corrects the detected master cylinder pressure, the correcting unit 37 corrects the detected master cylinder pressure in response to the effect of increase of the pedal depression force in the booster 24 when the detected master cylinder pressure has reached the dead point master cylinder pressure. Further, when the correcting unit 37 corrects the detected master cylinder pressure, the correcting unit 37 corrects the detected master cylinder pressure in response to the deviation between the detected master cylinder pressure and the dead point master cylinder pressure.

Specifically, as the correction of the detected master cylinder pressure in response to the effect of increase of the pedal depression force, the correcting unit 37 corrects the detected master cylinder pressure using a so-called servo ratio which is the boost ratio of the booster 24 when the detected master cylinder pressure has reached the dead point master cylinder pressure. The servo ratio of the booster 24 is a previously set design item and varies in response to the supplied negative pressure and the like and becomes a very small value after, for example, the negative pressure dead point of the booster 24 has been exceeded as compared with the time before it has not been exceeded. The servo ratio of the booster 24 can be unambiguously determined in response to the negative pressure supplied to the booster 24 and the like. The correcting unit 37 corrects the detected master cylinder pressure by multiplying the servo ratio to an amount of the detected master cylinder pressure which becomes larger than the dead point master cylinder pressure after the detected master cylinder pressure has exceeded the dead point master cylinder pressure. With the operation, the correcting unit 37 can calculate the detected master cylinder pressure assuming a case that the pedal depression force is increased as it is at the servo ratio at the time the detected master cylinder pressure has exceeded the dead point master cylinder pressure.

That is, when actual detected master cylinder pressure detected by the master cylinder pressure sensor 40 is shown by "Pmc", the dead point master cylinder pressure estimated by the estimating unit 36 is shown by "Pmc0", and the servo ratio when the detected master cylinder pressure has reached the dead point master cylinder pressure is shown by "Rs", the correcting unit 37 can determine corrected master cylinder pressure Pmchosei that is the master cylinder pressure after correction by the following expression (1).

$$Pmchosei = (Pmc - Pmc0) \times Rs + Pmc \quad (1)$$

Then, when the detected master cylinder pressure has exceeded the dead point master cylinder pressure, the acquiring/determining unit 34 executes the determination as to the control for keeping braking force generated to the wheels 8 of the vehicle 4 to the predetermined value or more based on the corrected master cylinder pressure which is a value corrected by the correcting unit 37 as described above. That is, when the detected master cylinder pressure has exceeded the dead point master cylinder pressure, the acquiring/determining unit 34 executes a determination whether or not the corrected master cylinder pressure reaches the control start determination value and a determination whether or not the corrected master cylinder pressure reaches the control cancel determination value. The executing unit 35 executes the slope start assist control including the braking force keeping control and the braking force keeping release control in response to a result of determination using the corrected master cylinder pressure by the acquiring/determining unit 34.

As a result, the braking device 1 and the ECU 3 can appropriately keep the braking force regardless of, for example, the state of the negative pressure supplied from the engine 6 to the booster 24, and the like.

Here, in FIG. 3, a horizontal axis illustrates the pedal depression force input by the driver and a vertical axis illustrates hydraulic pressure, and, in FIG. 4, a horizontal axis illustrates a time and a vertical axis illustrates hydraulic pressure. In FIGS. 3 and 4, a solid line illustrates the detected master cylinder pressure Pmc and a dotted line illustrates the corrected master cylinder pressure Pmchosei. As illustrated in FIG. 3, it is assumed that the master cylinder pressure, when aimed pedal depression force A1, which is previously set, for example, in design, is ordinarily increased by the booster 24, is set as a control determination value Pth in order to detect the additional depression operation of the brake pedal 21 which is executed by the driver, by the aimed pedal depression force A1. In the case, when the detected master cylinder pressure Pmc has exceeded the dead point master cylinder pressure Pmc0, since an effect of amplification of the pedal depression force in the booster 24 almost disappears actually, a pedal depression force A2 larger than the aimed pedal depression force A1 is necessary until the detected master cylinder pressure Pmc before amendment actually reaches the control determination value Pth.

However, when the detected master cylinder pressure has exceeded the dead point master cylinder pressure, the braking device 1 and the ECU 3 of the embodiment execute the determination as to the slope start assist control based on the corrected master cylinder pressure Pmchosei corrected using the expression (1). Accordingly, even if the effect of amplification of the pedal depression force in the booster 24 almost disappears actually, the braking device 1 and the ECU 3 of the embodiment can execute the determination as to the slope start assist control assuming that the pedal depression force is increased as it is. That is, the braking device 1 and the ECU 3 can accurately determine an intention of the driver in response to the negative pressure supplied to the booster 24 and, more specifically, in response to a variation of the negative pressure dead point estimated from the negative pressure.

As a result, the braking device 1 and the ECU 3 can cause the corrected master cylinder pressure Pmchosei to reach the control determination value Pth at all times by a pedal depression force similar to the aimed pedal depression force A1 regardless of the negative pressure dead point of the booster 24 and the like and thus can operate the slope start assist control at all times by the additional depression operation in the pedal depression force having a magnitude which is aimed at in design. Further, with the operation, as illustrated in FIG. 4, since the braking device 1 and the ECU 3 can reduce a time, which is required to detect the additional depression operation of the brake pedal 21 executed by the driver when the detected master cylinder pressure has exceeded the dead point master cylinder pressure, from a time t2 to a time t1, it can be also prevented that a dispersion is generated in a time until the additional depression operation is detected. Accordingly, the braking device 1 and the ECU 3 can suppress that a dispersion is generated in a feeling of the additional depression operation for a start and a cancel of the control executed by the driver, and, in other words, it can be suppressed that a dispersion is generated in the start and the cancel of the control, a timing of pressure reduction, and the like.

Further, when the detected master cylinder pressure has exceeded the dead point master cylinder pressure, since the braking device 1 and the ECU 3 of the embodiment correct the detected master cylinder pressure which is a vehicle state amount detected by the master cylinder pressure sensor 40, an aimed target control determination value itself can be fixed as a value without being changed, an increase of a man-hour to be adapted can be prevented and the increase can be coped with by simply changing a software program. Accordingly, the braking device 1 and the ECU 3 can also suppress an increase of manufacturing cost while appropriately keeping the braking force.

Next, an example of the control in the braking device 1 will be explained referring to a flowchart of FIG. 5. Note that these control routines are repeatedly executed at a control cycle of several milliseconds to several tens of milliseconds.

First, the ECU 3 obtains information as to the detected master cylinder pressure Pmc and the negative pressure supplied to the booster 24 detected by the acquiring/determining unit 34, and the estimating unit 36 estimates the dead point master cylinder pressure Pmc0. Then, the acquiring/determining unit 34 determines whether or not the detected master cylinder pressure Pmc is larger than the dead point master cylinder pressure Pmc0 (S100).

In the ECU 3, when it is determined that the detected master cylinder pressure Pmc is larger than the dead point master cylinder pressure Pmc0 (S100: Yes), the correcting unit 37 calculates the corrected master cylinder pressure Pmchosei using the expression (1) based on the detected master cylinder pressure Pmc, the negative pressure supplied to the booster 24, and the like obtained at S100. Then, the correcting unit 37 sets the corrected master cylinder pressure Pmchosei as a final master cylinder pressure Pmcf (S102). Then, the acquiring/determining unit 34 executes the determination as to the slope start assist control based on final master cylinder pressure Pmcf set at S102 (S104), and the executing unit 35 executes the slope start assist control in response to a result of determination by the acquiring/determining unit 34, finishes the present control cycle, and goes to a next control cycle.

When it is determined that the detected master cylinder pressure Pmc is equal to or less than the dead point master cylinder pressure Pmc0 (S100: No), the ECU 3 sets the detected master cylinder pressure Pmc obtained by the acquiring/determining unit 34 at S100 as the final master cylinder pressure Pmcf as it is (S106). Then, the acquiring/determining unit 34 executes the determination as to the slope start assist control based on the final master cylinder pressure Pmcf set at S106 (S104), and the executing unit 35 executes the slope start assist control in response to a result of determination by the acquiring/determining unit 34, finishes the present control cycle, and goes to a next control cycle.

An exemplary embodiment of an operation of the braking device 1 controlled as described above will be illustrated in FIG. 6. In FIG. 6, a horizontal axis illustrates a time and a vertical axis illustrates hydraulic pressure. Further, in FIG. 6, a line L1 illustrates the control determination value, a line L2 illustrates the dead point master cylinder pressure in the negative pressure dead point of the booster 24, a line L3 illustrates the actual detected master cylinder pressure detected by the master cylinder pressure sensor 40, and a line L4 illustrates the corrected master cylinder pressure.

Note that when it is assumed that the effect of increase of the pedal depression force by the booster 24 is sufficient, a line L5 illustrates estimated master cylinder pressure estimated from actually measured pedal depression force to the brake pedal 21. As is also apparent from the figure, it can be found that the corrected master cylinder pressure has reached the control determination value by pedal depression force having the same magnitude as that approximately aimed at in design as well as a time until the corrected master cylinder pressure reaches the control determination value is reduced by ΔT as compared with a time until the detected master cylinder pressure reaches the control determination value.

According to the ECU 3 according to the embodiment explained above, control is executed which keeps braking force generated to the wheels 8 of the vehicle 4 to a predetermined value or more when detected master cylinder pressure, which is master cylinder pressure input to the brake pedal 21 in a state that the vehicle 4 stops and applied to brake oil in response to pedal depression force increased using negative pressure generated in the engine 6 of the vehicle 4 and which is the master cylinder pressure detected by the master cylinder pressure sensor 40, has reached a control determination value as well as when the detected master cylinder pressure has exceeded dead point master cylinder pressure, which is the master cylinder pressure at a negative pressure dead point at which an effect of increase of the pedal depression force using the negative pressure disappears, at least the master cylinder pressure is corrected and the control is executed based on the corrected value.

According to the ECU 3 according to the embodiment explained above, when detected master cylinder pressure, which is master cylinder pressure input to the brake pedal 21 and applied to brake oil in response to pedal depression force increased using negative pressure generated in the engine 6 of the vehicle 4 and which is the master cylinder pressure detected by the master cylinder pressure sensor 40, has exceeded dead point master cylinder pressure, which is the master cylinder pressure at a negative pressure dead point at which an effect of increase of the pedal depression force using the negative pressure disappears, the detected master cylinder pressure is corrected and a determination as to control for keeping the braking force generated to the wheels 8 of the vehicle 4 to a predetermined value or more is executed based on the corrected value.

According to the braking device 1 according to the embodiment explained above, the braking device 1 includes the ECU 3 and the hydraulic braking device 2 which is controlled by the ECU 3 and generates the braking force.

Accordingly, when the detected master cylinder pressure has exceeded the dead point master cylinder pressure, since the braking device 1 and the ECU 3 correct at least the detected master cylinder pressure and execute the control based on the corrected value, the braking device 1 and the ECU 3 can appropriately keep the braking force.

Note that the brake control device and the braking device according to the embodiment of the present invention described above are not limited to the embodiment described above and can be variously modified within the scope described in claims.

Figure 7:
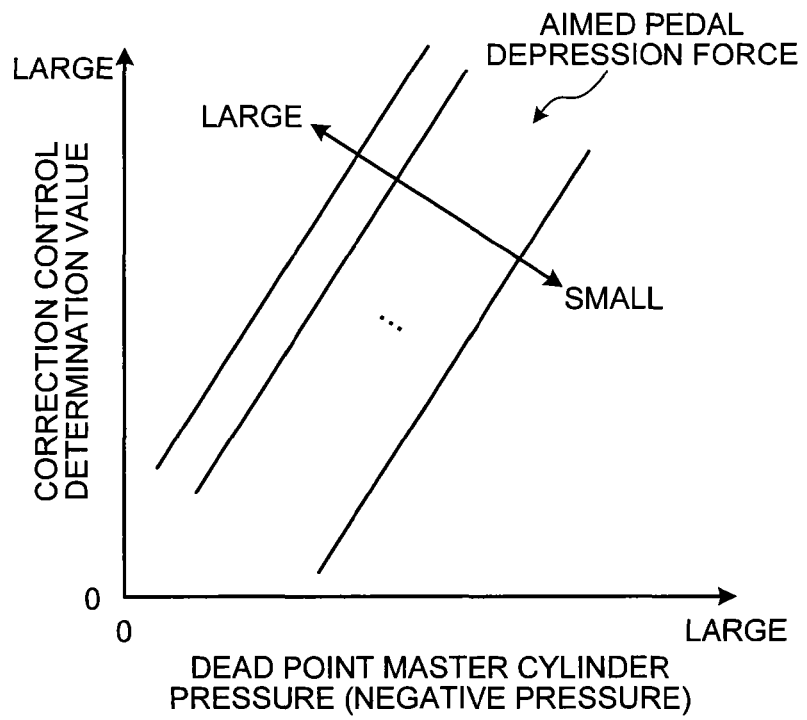
FIG. 7 is an example of a corrected control determination value map of a braking device according to a modification.
Figure 8:
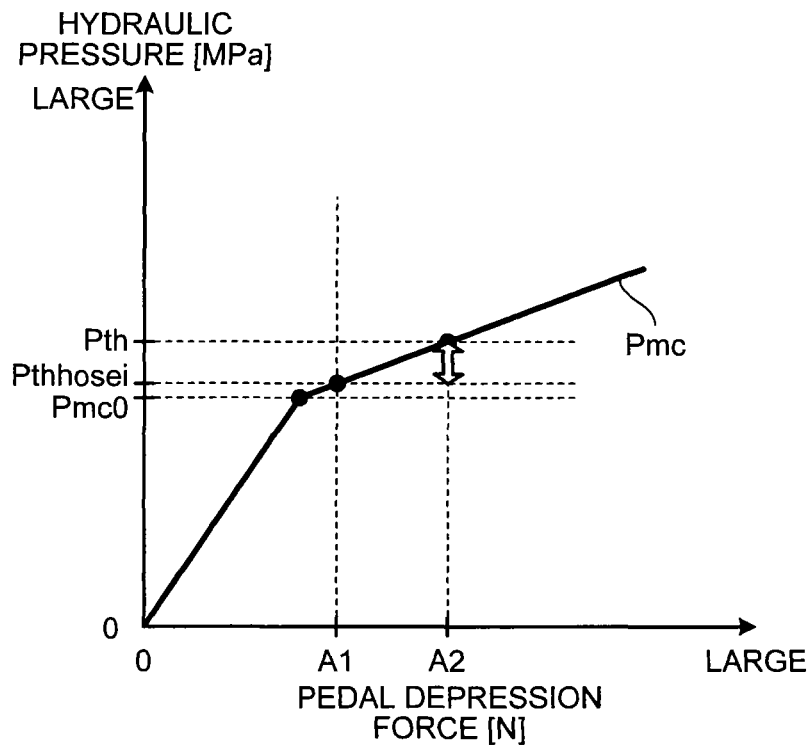
FIG. 8 is a graph explaining an example of control in the braking device according to the modification.
Figure 9:
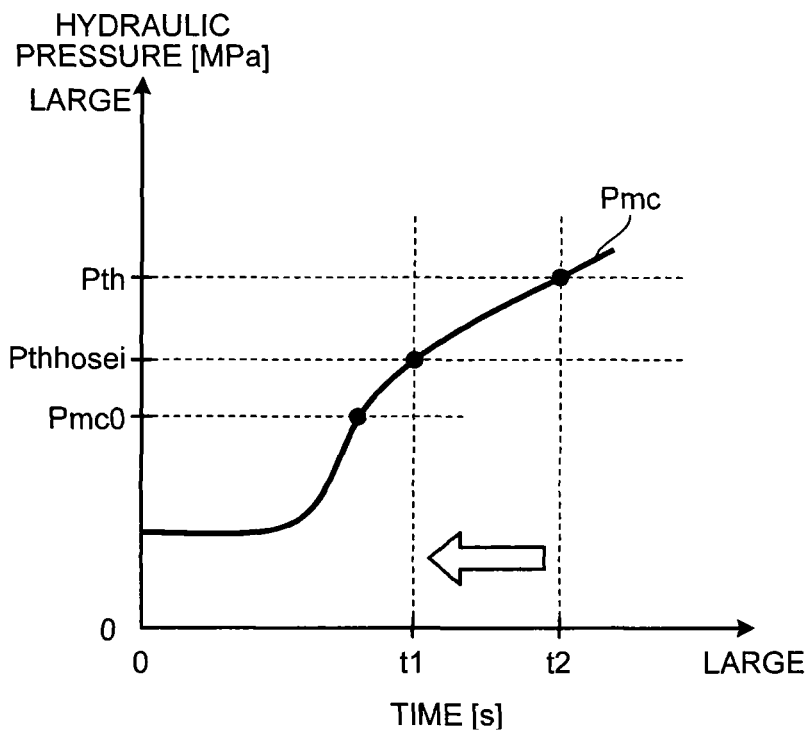
FIG. 9 is a time chart illustrating an example of the control in the braking device according to the modification.

FIG. 7 is an example of a corrected control determination value map of a braking device according to a modification, FIG. 8 is a graph explaining an example of control in the braking device according to the modification, and FIG. 9 is a time chart illustrating an example of the control in the braking device according to the modification.

A braking device 1 and an ECU 3 according to the modification are different from the embodiment described above in that when the detected master cylinder pressure has exceeded the dead point master cylinder pressure, a correcting unit 37 corrects the control determination value. Here, when the correcting unit 37 corrects the control determination value, the correcting unit 37 corrects the control determination value so that a deviation between the detected master cylinder pressure and the control determination value becomes small, that is, the correcting unit 37 corrects the control determination value to a smaller value.

Specifically, the correcting unit 37 determines a corrected control determination value based on, for example, a corrected control determination value map exemplified in FIG. 7. The corrected control determination value map describes a relation among the dead point master cylinder pressure (in other words, the negative pressure supplied to a booster 24), the aimed pedal depression force previously set in design to detect the additional depression operation of a brake pedal 21 by a driver, and the corrected control determination value. In the corrected control determination value map, the corrected control determination value is increased by an increase of the dead point master cylinder pressure and increased by an increase of the aimed pedal depression force. An estimating unit 36 determines the corrected control determination value from dead point master cylinder pressure and the aimed pedal depression force based on the corrected control determination value map.

Then, when the detected master cylinder pressure has exceeded the dead point master cylinder pressure, an acquiring/determining unit 34 executes the determination as to control for keeping braking force generated to wheels 8 of a vehicle 4 to a predetermined value or more based on the corrected control determination value which is a value corrected by the correcting unit 37 as described above.

As a result, when the detected master cylinder pressure has exceeded the dead point master cylinder pressure, the braking device 1 and the ECU 3 of the modification executes a determination as to the slope start assist control using a corrected control determination value Pthhosei corrected using the map exemplified in FIG. 7. Accordingly, even if an effect of amplification of the pedal depression force in a booster 24 almost disappears actually, the braking device 1 and the ECU 3 can execute the determination as to the slope start assist control by changing the control determination value Pth to the corrected control determination value Pthhosei having a smaller value as illustrated in FIG. 8.

Accordingly, the braking device 1 and the ECU 3 can cause the detected master cylinder pressure Pmc to reach the corrected control determination value Pthhosei by pedal depression force similar to the aimed pedal depression force A1 at all times regardless of the negative pressure dead point of the booster 24 and the like and thus can operate the slope start assist control by the additional depression operation in the pedal depression force having a magnitude aimed at in design at all times. Further, with the operation, as illustrated in FIG. 9, the braking device 1 and the ECU 3 can also reduce a time, which is required to detect the additional depression operation of the brake pedal 21 executed by the driver when the detected master cylinder pressure has exceeded the dead point master cylinder pressure, and it can be also prevented that a dispersion is generated in a time until the additional depression operation is detected.

Further, when the detected master cylinder pressure has exceeded the dead point master cylinder pressure, since the braking device 1 and the ECU 3 of the modification corrects the control determination value set to the detected master cylinder pressure, the braking device 1 and the ECU 3 can directly adapt the aimed control determination value and thus can more accurately determine the intention of the driver in response to a variation of the negative pressure supplied to the booster 24, more specifically, in response to a variation of the negative pressure dead point estimated from the negative pressure.

According to the braking device 1 and the ECU 3 according to the modification explained above, when the control determination value is corrected, the control determination value is corrected to a smaller value. In the case, when the detected master cylinder pressure has exceeded the dead point master cylinder pressure, since the braking device 1 and the ECU 3 correct at least the control determination value and execute the control based on the corrected value, the braking device 1 and the ECU 3 can appropriately keep the braking force.

Note that, in the above explanation, although the explanation is made assuming that when the detected operating pressure has exceeded the dead point operating pressure, the brake control device and the braking device correct any one of the detected operating pressure or the control determination value, the brake control device and the braking device may correct both the detected operating pressure and the control determination value.

INDUSTRIAL APPLICABILITY

As described above, the brake control device and the braking device according to the present invention can appropriately keep braking force and are preferably used to various brake control devices and braking devices which generate braking force to wheels of a vehicle by operating a brake operating member.

REFERENCE SIGNS LIST

1 BRAKING DEVICE
2 HYDRAULIC BRAKING DEVICE (BRAKING DEVICE MAIN BODY)
3 ECU (BRAKE CONTROL DEVICE)
4 VEHICLE
6 ENGINE (INTERNAL COMBUSTION ENGINE)
8 WHEEL
21 BRAKE PEDAL (BRAKE OPERATING MEMBER)
22 MASTER CYLINDER
24 BOOSTER
25 ACTUATOR
40 MASTER CYLINDER PRESSURE SENSOR (OPERATING PRESSURE DETECTING UNIT)

The invention claimed is:

1. A brake control device comprising:
processor circuitry configured to keep braking force generated to wheels of a vehicle to a predetermined value or more when detected operating pressure has reached a control determination value, the detected operating pressure being operating pressure input to a brake operating member in a state that the vehicle stops and applied to a working fluid in response to operation force increased using negative pressure generated in an internal combustion engine of the vehicle and being the operating pressure detected by an operating pressure detecting unit, and
when the detected operating pressure has exceeded dead point operating pressure which is the operating pressure at a negative pressure dead point at which an effect of increase of the operation force using the negative pressure disappears, at least any one of the detected operating pressure and the control determination value is corrected and the control is executed based on the corrected value,
when the detected operating pressure continuously increases after the detected operating pressure has exceeded the dead point operating pressure, the detected operating pressure or the control determination value is corrected, and
when the detected operating pressure decreases after the detected operating pressure has exceeded the dead point operating pressure, the detected operating pressure and the control determination value are not corrected.

2. The brake control device according to claim 1, wherein when the detected operating pressure is corrected, the detected operating pressure is corrected to a larger value.

3. The brake control device according to claim 2, wherein when the detected operating pressure is corrected, the detected operating pressure is corrected in response to an effect of increase of the operation force when the detected operating pressure has reached the dead point operating pressure.

4. The brake control device according to claim 2, wherein when the detected operating pressure is corrected, the detected operating pressure is corrected in response to a deviation between the detected operating pressure and the dead point operating pressure.

5. The brake control device according to claim 2, wherein when the control determination value is corrected, the control determination value is corrected to a smaller value.

6. The brake control device according to claim 1, wherein when the detected operating pressure is corrected, the detected operating pressure is corrected in response to an effect of increase of the operating force when the detected operating pressure has reached the dead point operating pressure.

7. The brake control device according to claim 6, wherein when the detected operating pressure is corrected, the detected operating pressure is corrected in response to a deviation between the detected operating pressure and the dead point operating pressure.

8. The brake control device according to claim 6, wherein when the control determination value is corrected, the control determination value is corrected to a smaller value.

9. The brake control device according to claim 1, wherein when the detected operating pressure is corrected, the detected operating pressure is corrected in response to a deviation between the detected operating pressure and the dead point operating pressure.

10. The brake control device according to claim 9, wherein when the control determination value is corrected, the control determination value is corrected to a smaller value.

11. The brake control device according to claim 1, wherein when the control determination value is corrected, the control determination value is corrected to a smaller value.

12. A brake control device comprising:
processor circuitry configured to correct a detected operating pressure and to execute a determination as to control for keeping braking force generated to wheels of the vehicle to a predetermined value or more based on the corrected pressure when detected operating pressure has exceeded dead point operating pressure, the detected operating pressure being operating pressure input to a brake operating member and applied to a working fluid in response to operating force increased using negative pressure generated in an internal combustion engine of a vehicle and being the operating pressure detected by an operating pressure detecting unit, and the dead point operating pressure being the operating pressure at a negative pressure dead point at which an effect of increase of the operating pressure using the negative pressure disappears,
when the detected operating pressure continuously increases after the detected operating pressure has exceeded the dead point operating pressure, the detected operating pressure is corrected, and
when the detected operating pressure decreases after the detected operating pressure has exceeded the dead point operating pressure, the detected operating pressure is not corrected.

13. A braking device, comprising:
a brake control device including
processor circuitry configured to keep braking force generated to wheels of a vehicle to a predetermined value or more when detected operating pressure has reached a control determination value, the detected operating pressure being operating pressure input to a brake operating member in a state that the vehicle stops and applied to a working fluid in response to operation force increased using negative pressure generated in an internal combustion engine of the vehicle and being the operating pressure detected by an operating pressure detecting unit, and
when the detected operating pressure has exceeded dead point operating pressure which is the operating pressure at a negative pressure dead point at which an effect of increase of the operation force using the negative pressure disappears, at least any one of the detected operating pressure and the control determination value is corrected and the control is executed based on the corrected value,
when the detected operating pressure continuously increases after the detected operating pressure has exceeded the dead point operating pressure, the detected operating pressure or the control determination value is corrected, and
when the detected operating pressure decreases after the detected operating pressure has exceeded the dead point operating pressure, the detected operating pressure and the control determination value are not corrected; and
a braking device main body configured to be controlled by the brake control device and generate braking force.

14. A braking device, comprising:
a brake control device including
processor circuitry configured to keep braking force generated to wheels of a vehicle to a predetermined value or more when detected operating pressure has reached a control determination value, the detected operating pressure being operating pressure input to a brake operating member in a state that the vehicle stops and applied to a working fluid in response to operation force increased using negative pressure generated in an internal combustion engine of the vehicle and being the operating pressure detected by an operating pressure detecting unit, and
when the detected operating pressure has exceeded dead point operating pressure which is the operating pressure at a negative pressure dead point at which an effect of increase of the operation force using the negative pressure disappears, at least any one of the detected operating pressure and the control determination value is corrected and the control is executed based on the corrected value,
when the detected operating pressure continuously increases after the detected operating pressure has exceeded the dead point operating pressure, the detected operating pressure or the control determination value is corrected, and
when the detected operating pressure decreases after the detected operating pressure has exceeded the dead point operating pressure, the detected operating pressure and the control determination value are not corrected,
wherein when the detected operating pressure is corrected, the detected operating pressure is corrected to a larger value; and
a braking device main body configured to be controlled by the brake control device and generate braking force.

15. A braking device, comprising:
a brake control device including
processor circuitry configured to correct a detected operating pressure and to execute a determination as to control for keeping braking force generated to wheels of the vehicle to a predetermined value or more based on the corrected pressure when detected operating pressure has exceeded dead point operating pressure, the detected operating pressure being operating pressure input to a brake operating member and applied to a working fluid in response to operating force increased using negative pressure generated in an internal combustion engine of a vehicle and being the operating pressure detected by an operating pressure detecting unit, and the dead point operating pressure being the operating pressure at a negative pressure dead point at which an effect of increase of the operating pressure using the negative pressure disappears, when the detected operating pressure continuously increases after the detected operating pressure has exceeded the dead point operating pressure, the detected operating pressure is corrected, and when the detected operating pressure decreases after the detected operating pressure has exceeded the dead point operating pressure, the detected operating pressure is not corrected, a braking device main body configured to be controlled by the brake control device and generate braking force.

* * * * *